Feb. 27, 1934.    G. M. BARNES    1,948,496
MUZZLE BRAKE FOR GUNS
Filed Feb. 17, 1932
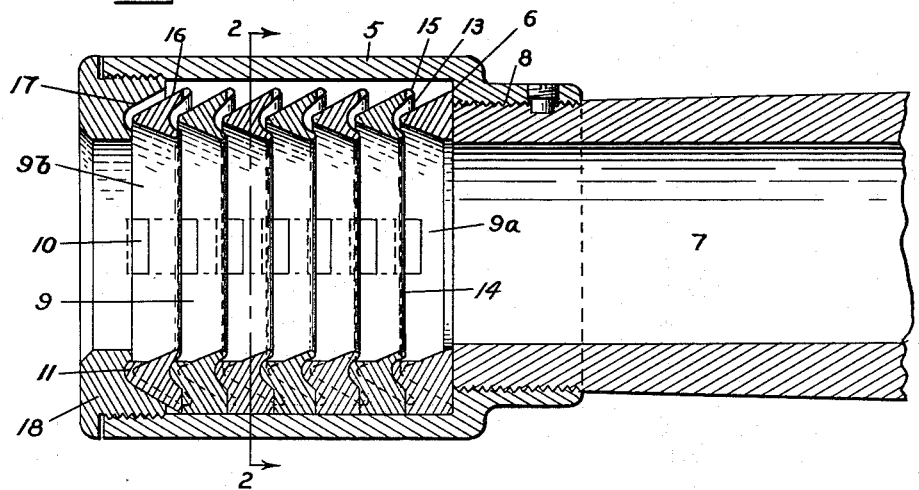
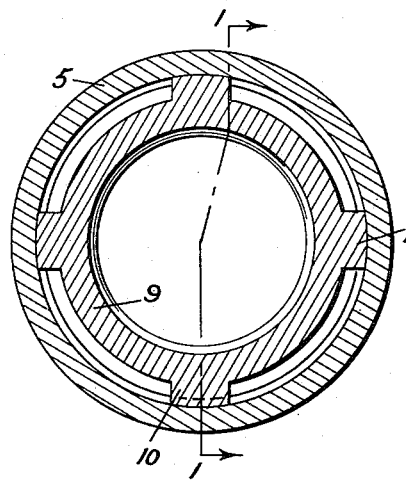
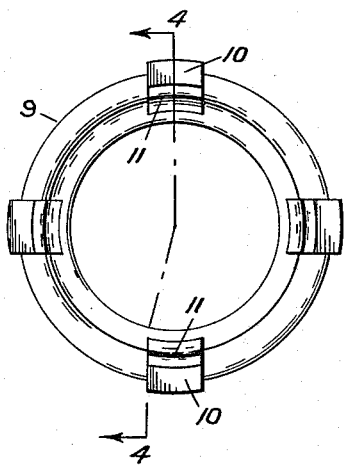
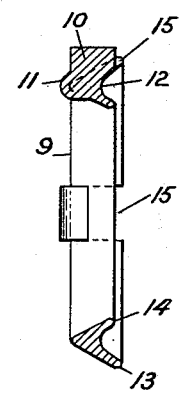
INVENTOR.
Gladeon M. Barnes
BY W. N. Roach
ATTORNEY Patented Feb. 27, 1934

1,948,496

UNITED STATES PATENT OFFICE 1,948,496

MUZZLE BRAKE FOR GUNS

Gladeon M. Barnes, United States Army, Hastings, Mich.

Application February 17, 1932. Serial No. 593,533

4 Claims. (Cl. 89—42)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a muzzle brake for guns.

The principal object of the present invention is to provide a strong and simple muzzle brake arranged to utilize a portion of the gases of discharge and then discharge the gases in a forward direction.

A further object is to provide a novel form of baffle ring that may be readily made and that lends itself to quick replacement in the assembly.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a longitudinal sectional view of the improved muzzle brake taken on the line 1—1 of Fig. 2.

Fig. 2 is a sectional view taken on the line 2—2 of Fig. 1.

Fig. 3 is a detail view in front elevation of one of the baffle rings.

Fig. 4 is a sectional view taken on the line 4—4 of Fig. 3.

The muzzle brake comprises an imperforate casing 5 having a reduced bore at its rear end to provide an annular shoulder 6 that is substantially flush with the face of the muzzle of a gun barrel 7 when the casing is secured in place thereon as by the threaded connection 8.

Within the casing there are a series of baffle rings 9 each centered by means of laterally projecting lugs 10 integral therewith and maintained in spaced relation with respect to each other by means of axially projecting lugs 11 associated with and forming part of the lugs 10.

The baffle rings in general, are triangular in cross-section and formed with a concave base 12. The outer edge or lip 13 of the base extends rearwardly beyond the plane of the inner edge or lip 14. The outer projecting lip 13 is provided with spaced recesses 15 each of which is adapted to receive the forward portion of one of the lugs 10 on the adjoining baffle ring. By virtue of this arrangement the lugs 10 and lip 15 on adjoining rings cooperate to lock the rings against relative turning movement. The lugs 10 are preferably of sufficient thickness to abut one another so that they augment the lugs 11 in maintaining an axially spaced relation between the main bodies of the rings.

The lugs 11 are shaped to correspond to the concave base 12 in which they fit. In addition to their function of spacing the rings, these lugs form bearing surfaces for transmitting the pressure exerted by impact of the gases on the baffle rings in a direction as nearly parallel as possible to the direction of recoil.

The innermost baffle ring 9a is formed with a plane base to abut the end of the gun. In the outermost ring 9b the lateral lugs are omitted to provide an inclined portion 16 continuous with the axial lugs 11 and adapted to bear against the inclined wall 17 of a retaining ring 18 that is threaded on the end of the casing 5, and serves to hold the series of baffle rings in place.

In operation the gases of the propellant charge follow the projectile and as they emerge from the muzzle of the gun they expand and pass laterally between the baffle rings. The force exerted by the gases on the concave bases of the baffle rings is sufficient to neutralize a considerable amount of the energy of recoil of the gun.

The gases deflected by the baffle rings are confined by the casing 5 and in order to escape they finally return through the baffle rings and resume their original forward movement. As a consequence of the forwardly directed dissipation of the gases they will not interfere with the gun crew or raise a cloud of dust by striking the ground.

I claim—

1. A muzzle brake for guns comprising a casing having provision for attachment to a gun barrel, a series of baffle rings in the casing, said rings being triangular in cross-section with a concave base, laterally projecting lugs on the rings spacing them from the casing and from each other, the lugs on one ring engaging the outer edge of the concave base of an adjoining ring, and axially projecting lugs on the rings fitting in and conforming to the concave base of an adjoining ring.

2. A muzzle brake for guns comprising a casing having provision for attachment to a gun barrel, a series of baffle rings in the casing, said rings being triangular in cross-section with a concave base, laterally projecting lugs on the rings spacing them from the casing and from each other, and the lugs on one ring engaging the outer edge of the concave base of an adjoining ring.

3. A muzzle brake for guns comprising a casing, a series of baffle rings in the casing, laterally projecting lugs on the rings spacing them from the casing and from each other, and the lugs on one ring having engagement with an adjoining ring whereby the rings are held against relative rotation.

4. A muzzle brake for guns comprising a casing, a series of baffle rings in the casing, and laterally projecting lugs on the rings spacing them from the casing and from each other.

GLADEON M. BARNES.